United States Patent
Schneuwly et al.

(10) Patent No.: US 12,026,631 B2
(45) Date of Patent: Jul. 2, 2024

(54) GENERALIZED PRODUCTION RULES—N-GRAM FEATURE EXTRACTION FROM ABSTRACT SYNTAX TREES (AST) FOR CODE VECTORIZATION

(71) Applicant: Oracle International Corporation, Redwood Shores, CA (US)

(72) Inventors: Arno Schneuwly, Effretikon (CH); Nikola Milojkovic, Dietikon (CH); Felix Schmidt, Baden-Daettwil (CH); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 861 days.

(21) Appl. No.: 17/131,944

(22) Filed: Dec. 23, 2020

(65) Prior Publication Data

US 2022/0198294 A1   Jun. 23, 2022

(51) Int. Cl.
*G06F 9/44* (2018.01)
*G06F 8/41* (2018.01)
(Continued)

(52) U.S. Cl.
CPC .............. *G06N 5/04* (2013.01); *G06F 8/427* (2013.01); *G06F 8/43* (2013.01); *G06F 16/2433* (2019.01);
(Continued)

(58) Field of Classification Search
None
See application file for complete search history.

(56) References Cited

U.S. PATENT DOCUMENTS

2014/0101117 A1   4/2014   Uzzaman
2018/0060211 A1   3/2018   Allen
(Continued)

FOREIGN PATENT DOCUMENTS

EP   2128798   12/2009

OTHER PUBLICATIONS

Peinador, U.S. Appl. No. 16/122,398, filed Sep. 5, 2018, Notice of Allowance, dated Apr. 29, 2021.
(Continued)

*Primary Examiner* — Insun Kang
(74) *Attorney, Agent, or Firm* — Hickman Becker Bingham Ledesma LLP; Brian Miller (57) ABSTRACT

Herein is resource-constrained feature enrichment for analysis of parse trees such as suspicious database queries. In an embodiment, a computer receives a parse tree that contains many tree nodes. Each tree node is associated with a respective production rule that was used to generate the tree node. Extracted from the parse tree are many sequences of production rules having respective sequence lengths that satisfy a length constraint that accepts at least one fixed length that is greater than two. Each extracted sequence of production rules consists of respective production rules of a sequence of tree nodes in a respective directed tree path of the parse tree having a path length that satisfies that same length constraint. Based on the extracted sequences of production rules, a machine learning model generates an inference. In a bag of rules data structure, the extracted sequences of production rules are aggregated by distinct sequence and duplicates are counted.

20 Claims, 5 Drawing Sheets

(51) Int. Cl.
  G06F 16/242    (2019.01)
  G06F 16/2455   (2019.01)
  G06N 5/025     (2023.01)
  G06N 5/04      (2023.01)
(52) U.S. Cl.
  CPC ....... *G06F 16/24564* (2019.01); *G06N 5/025* (2013.01)

(56) References Cited

U.S. PATENT DOCUMENTS

| | | | |
|---|---|---|---|
| 2018/0096144 A1* | 4/2018 | Pan | G06F 21/563 |
| 2019/0018614 A1 | 1/2019 | Balko | |
| 2019/0188212 A1* | 6/2019 | Miller | G06N 20/00 |
| 2020/0045049 A1 | 2/2020 | Apostolopoulos | |
| 2020/0076840 A1 | 3/2020 | Peinador | |

OTHER PUBLICATIONS

Peinador, U.S. Appl. No. 16/122,398, Final Office Action, dated Jan. 28, 2021.
He et al., "A Reusable SQL Injection Detection Method for Java Web Applications", KSII Transactions On Internet and Information Systems vol. 14, No. 6, dated Jun. 2020, 15 pages.
Alon et al., "A General Path-Based Representation for Predicting Program Properties", dated Apr. 22, 2018, 16 pages.
Zhang et al., "A Novel Neural Source Code Representation based on Abstract Syntax Tree", 2019 IEEE/ACM 41st International Conference on Software Engineering (ICSE), 2019, 12 pages.
Sharma et al., "A Survey on Machine Learning Techniques for Source Code Analysis", dated 2021, 59 pages.
Rabinovich et al., "Abstract Syntax Networks for Code Generation and Semantic Parsing", dated 2017, 11 pages.
Ndichu et al., "A machine learning approach to detection of JavaScript-based attacks using AST features and paragraph vectors", Applied Soft Computing 84, 2019, 11 pages.
Follenfant et al., "SQL Abstract Syntax Trees Vocabulary", available: https://ns.inria.fr/ast/sql/index.html, Jan. 2014, 26 pages.
Radford, Alec et al., "Improving language understanding by generative pre-training", 2018.
Radford, Alec et al., "Language models are unsupervised multitask learners", Openai Blog, 1(8):9, 2019.
Kanade, Aditya et al., "Learning and Evaluating Contextual Embedding of Source Code", Proceedings of the 37th International Conference On Machine Learning, Jul. 13-18, 2020, vol. 119 of Proceedings of Machine Learning Research, pp. 5110-5121.
Devlin, Jacob et al., "BERT: Pre-training of Deep Bidirectional Transformers for Language Understanding", Proceedings of The 2019 Conference of the North American Chapter of the Association for Computational Linguistics, Jun. 2-7, 2019, 4171-4186.
Alon, Uri et al., "code2vec: learning distributed representations of code", Proc. ACM Program. Lang., 3(POPL):40:1-40:29, 2019.
Alon, Uri et al., "code2seq: Generating sequences from structured representations of code", 7th International Conference On Learning Representations, ICLR 2019, New Orleans, LA, USA, May 6-9, 2019, OpenReview.net, 2019.
Peinador, U.S. Appl. No. 16/122,398, filed Sep. 5, 2018, Office Action, dated Oct. 28, 2020.
Jimenez et al., "On the Impact of Tokenizer and Parameters on N-Gram Based Code Analysis", dated 2018, 12 pages.
An et al., "Variational Autoencoder based Anomaly Detection Using Reconstruction Probability", 2015-2 Special Lecture on IE, dated Dec. 27, 2015, 18 pages.
Apel et al., "Learning SQL for Database Intrusion Detection using Context-sensitive Modelling", dated 2009, 33 pages.
Bengio et al., "Learning Deep Architectures for AI", dated 2009, 71 pages.
Bockermann et al., "Learning SQL for Database Intrusion Detection Using Context-Sensitive Modelling", DIMVA dated 2009, LNCS 5587, 10 pages.
Cai et al., "An Abstract Syntax Tree Encoding Method for Cross-Project Defect Prediction", IEEE, dated Nov. 15, 2019, 10 pages.
Ding et al., "PCA-Based Network Traffic Anomaly Detection" Tsinghua Science and Technology, vol. 21, No. 5, Oct. 2016, 10 pages.
Garcia-Duran et al. "Learning Graph Representations with Embedding Propagation", 31st Conference on Neural Information Processing Systems (NIPS 2017), 12 pages.
Gibert et al., "Graph Embedding in Vector Spaces", GbR'2011 Mini-tutorial, dated 2011, 66 pages.
Grover et al., "node2vec: Scalable Feature Learning for Networks", KDD '16, Aug. 13-17, 2016, San Francisco, CA, USA, 10 pages.
Hamilton et al., "Inductive Representation Learning on Large Graphs", 31st Conference on Neural Information Processing Systems (NIPS 2017), Long Beach, CA, USA, 11 pages.
Huang et al., "Online System Problem Detection by Mining Patterns of Console Logs", dated Dec. 2009, 11 pages.
Zhang et al., "Automated IT System Failure Prediction: A Deep Learning Approach", dated 2016, 11 pages.
Liu et al., "Isolation Forest", dated 2008, 10 pages.
Maglaras et al. "A real time OCSVM Intrusion Detection module with low overhead for SCADA systems", International Journal of Advanced Research in Artificial Intelligence, vol. 3, No. 10, 2014, 9 pgs.
Mou et al., "Building Program Vector Representations for Deep Learning", dated Sep. 11, 2014, 11 pages.
Perozzi et al., "DeepWalk: Online Learning of Social Representations", dated 2014, 10 pages.
Scholkopf et al. "Estimating the Support of a High-Dimensional Distribution", dated Nov. 27, 1999, 28 pages.
Wei et al., "Graph embedding based feature selection", Neurocomputing 93 dated May 17, 2012, 11 pages.
Xu et al. "Detecting Large-Scale System Problem by Mining Console Logs", SOSP'09, Oct. 11-14, 2009, 15 pages.
Yamaguchi et al., "Generalized Vulnerability Extrapolation using Abstract Syntax Trees", ACSAC '12 Dec. 3-7, 2012, Orlando, Florida USA, 10 pages.
Yamanishi et al., "Dynamic Syslog Mining for Network Failure Monitoring", KDD'Aug. 21-24, 05, 2005, Chicago, Illinois, USA, 10 pages.
Yen et al., "Beehive: Large-Scale Log Analysis for Detecting Suspicious Activity in Enterprise Networks", ACSAC '13 dated Dec. 9-13, 2013, New Orleans, Louisiana, USA, 10 pages.
Zhang et al., "Network Anomaly Detection Using One Class Support Vector Machine", Proceedings of the International MultiConference of Engineers and Computer Scientists 2008 vol. I, Mar. 19, 2008, 5 pages.
Hamilton et al., "Representation Learning on Graphs: Methods and Applications", Copyright 2017 IEEE, 24 pages.
Zhang, Jian, et al., "A Novel Neural Source Code Representation Based on Abstract Syntax Tree", 2019 IEEE/ACM 41st ICSE, doi: 10.1109/ICSE.2019.00086, pp. 783-794, May 25, 2019, 12pgs.
Zeng, Jie, et al., "Fast Code Clone Detection Based on Weighted Recursive Autoencoders", IEEE Access, vol. 7; pp. 125062-125078, 2019. doi: 10.1109/ACCESS.2019.2938825, published Sep. 2, 2019, 17pgs.
White, Martin, et al., "Deep Learning Code Fragments for Code Clone Detection", 31st IEEE/ACM ICASE 2016, dx.doi.org/10.1145/2970276.2970326, pp. 87-98, publ Aug. 25, 2016, 12pgs.
Parr, Terence, "The Definitive ANTLR 4 Reference", The Pragmatic Bookshelf, copyright 2012The Pragmatic Programmers, LLC, www.it-ebooks.info, book version Jan. 2013, 322pgs.
Jiang, Lingxiao, et al., "Deckard: Scalable and Accurate Tree-based Detection of Code Clones", 29th ICSE '07, doi: 10.1109/ICSE.2007.30, pp. 96-105, May 24, 2007, 10pgs.
Gao, Yi, et al., "TECCD: A Tree Embedding Approach for Code Clone Detection", 2019 IEEE CSME, doi: 10.1109/ICSME.2019.00025, pp. 145-156, 2019, 12pgs.
Fang, Chunrong, et al., "Functional code clone detection with syntax and semantics fusion learning", Proc of the 29th ACM (56) References Cited

OTHER PUBLICATIONS

SIGSOFT ISSTA '20, pp. 516-527, doi: 10.1145/3395363.3397362, Jul. 18, 2020, 12pgs.

* cited by examiner

201 Receive parse tree that contains tree nodes associated with respective production rule that generated tree node 202 Extract sequences of production rules having respective sequence lengths that satisfy length constraint that accepts at least one fixed length that is greater than two 203 Based on extracted sequences of production rules having respective sequence lengths that satisfy length constraint that accepts at least one fixed length that is greater than two, machine learning (ML) model inferences

GENERALIZED PRODUCTION RULES—N-GRAM FEATURE EXTRACTION FROM ABSTRACT SYNTAX TREES (AST) FOR CODE VECTORIZATION

FIELD OF THE INVENTION

The present invention relates to machine learning for detection of anomalous logic syntax. Herein is resource-constrained feature enrichment for analysis of parse trees such as suspicious database queries.

BACKGROUND

Whether intentionally or accidentally, an abnormal logic statement such as a structured query language (SQL) statement may harm a computer process, stored data, and/or personal privacy. A technical problem with detecting an anomalous logic statement is that the statement may contain significant complexity and occur with a problem space of billions of possible distinct statements. Thus, it may be infeasible or impossible to detect that a statement is anomalous until runtime when the statement is submitted for execution. Additionally, latency and accuracy of anomaly detection may be crucial to system security and throughput and may be satisfied by a machine learning (ML) model.

Representing or summarizing a parse tree of a suspect logic statement in a format that an ML model can leverage is another technical problem because of significant flexibility in the internal organization of the logic statement. For example, a programming language is defined by a formal grammar. The grammar defines a set of terminal and non-terminal symbols. The terminal symbols represent acceptable tokens in the source code. In a parse tree such as an abstract syntax tree (AST), those tokens are the leaf nodes. The non-terminal symbols are the set of possible non-leaf nodes in the tree. The grammar defines which combinations of tree nodes are possible according to production rules, which may allow for virtually infinite possible parse trees.

In any case, ML algorithms may require a numeric representation of the input data. For example, an ML model such as an artificial neural network (ANN) may primarily operate by numeric calculations. There are various encoding strategies for ASTs of source logic. Tree path extraction is an explicit feature extraction strategy that does not scale because the number of features can grow rapidly with an increasing number of available tokens. For example because feature vectors for a same ML model should have a same width, path extraction requires that a feature vector be wide enough to accommodate a biggest expected tree such as a tallest tree, a widest tree, and/or a tree that contains the most tree nodes. Thus, parse trees are difficult to accommodate in feature vectors without significantly lossy encoding, which has limited the evolution of ML analysis of parse trees.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Approaches herein relate to machine learning (ML) for detection of anomalous logic syntax. Herein is resource-constrained feature enrichment for analysis of parse trees such as suspicious database queries. Approaches herein extract general-purpose ML features from abstract syntax trees (ASTs) resulting from parsing logic with respect to a specific programming language grammar. The resulting feature vectors may be used for ML related tasks in the context of programming languages, structured documents, and natural language. Examples include anomaly detection for structured query language (SQL) statements, text similarity detection, language translation, vulnerability detection, logic generation based on natural language description, automated documentation generation, authorship detection, maliciousness judging, automated code commenting, automated database optimization, and database workload analysis. Techniques herein may also be used for other applications in autonomous software systems using a vectorized representation of logic statements or other text, for example in systems relying on hashing, caching, and/or generated signatures.

To capture and represent structural correlations in sequences of contiguous tree nodes (i.e. tree paths), novel techniques herein include a tree traversal strategy to extract sub-paths of various predefined lengths from tree descent paths that may occur anywhere between the root and the leaves in parse trees. Syntactic and contextual relationships are extracted from a parse tree even though those structural relationships are not directly visible in source logic or other text.

Advantages of techniques herein include low algorithmic complexity, low and fixed spatial (i.e. memory) demand, increased structural and contextual retention, and inherent ML explainability (MLX) due to express retention of grammatical features such as production rules used by a parser to construct the parse tree being analyzed.

Resource-constrained techniques herein do not degrade the performance of SQL anomaly detection. For example, bag-of-rules approaches herein are suitable for real time inferencing with live streaming logic statements such as when embedded in a multitenant database management system (DBMS). Various embodiments may entail ASTs, parse trees, or other tree related structures such as a document object model (DOM) for JavaScript object notation (JSON) or extensible markup language (XML). In an embodiment, the parse tree represents natural language such as English. Herein, AST and parse tree may be synonymous.

In an embodiment, a computer receives a parse tree that contains many tree nodes. Each tree node is associated with a respective production rule that was used to generate the tree node. Extracted from the parse tree are many sequences of production rules having respective sequence lengths that satisfy a length constraint that accepts at least one fixed length that is greater than two. Each extracted sequence of production rules consists of respective production rules of a sequence of tree nodes in a respective directed tree path of the parse tree having a path length that satisfies that same length constraint that accepts at least one fixed length that is greater than two. Based on the extracted sequences of production rules having respective sequence lengths that satisfy the length constraint that accepts at least one fixed length that is greater than two, a machine learning (ML) model generates an inference.

In an embodiment the inference is an anomaly score for detecting whether or not the parse tree is anomalous. In an embodiment in a bag of rules data structure, the extracted sequences of production rules are aggregated by distinct sequence, and duplicates are counted. In an embodiment, the bag of rules is encoded into a feature vector that the ML model accepts as input.

As a compact structural summary of a parse tree, the bag of rules herein improves computer performance as follows. Using huge parse trees in their uncondensed form may be infeasible. For example with direct analysis of a huge parse tree, training or inferencing latency of the ML model may be too long, inference accuracy of the ML model may be too low, and/or memory demand by the ML model may be too high for practical use. Herein, the ML model analyzes the bag of rules instead of directly analyzing the parse tree.

In an embodiment, the bag of rules only stores tallies of distinct production rule sequences that occur in the parse tree and in a predefined vocabulary of production rule sequences. For example, herein is a bag of rules that is encoded as only a few unsigned integers that each need a respective byte in a feature vector, no matter how many tree nodes are contained in the parse tree and no matter how many tree paths of all possible lengths are contained in the parse tree. In other words, the bag of rules is highly scalable such that increasing scale of the parse tree causes arithmetically increased tallies in the stored counts without needing a larger bag of rules. Thus, a fixed size bag of rules can summarize any parse tree in a training corpus.

1.0 Example Computer

Figure 1:
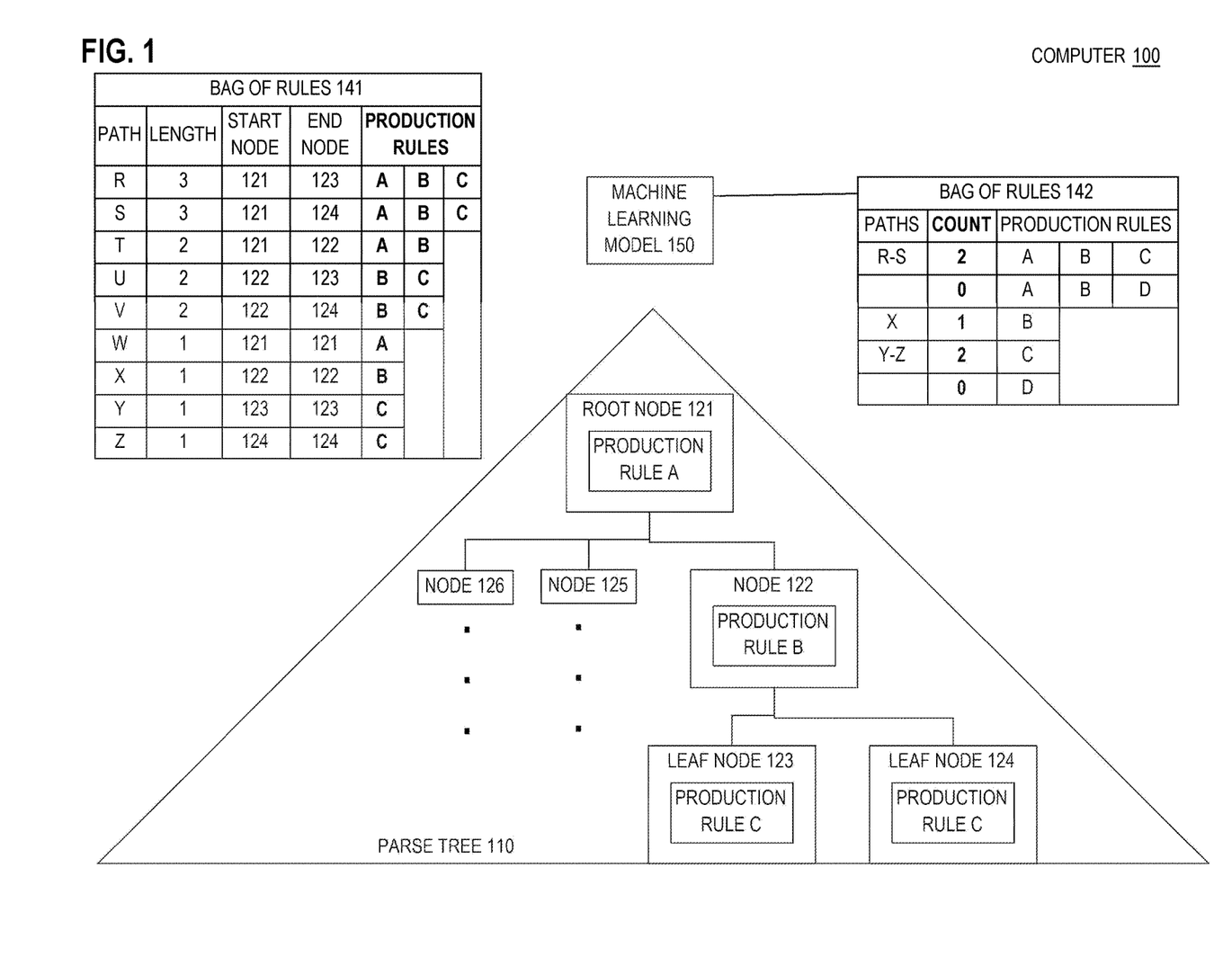
FIG. 1 is a block diagram that depicts an example computer that, without incurring computational complexity, generates a feature vector having increased contextual content for inferencing about a parse tree by a machine learning (ML) model such as for anomaly detection.

FIG. 1 is a block diagram that depicts an example computer 100, in an embodiment. Without incurring computational complexity, computer 100 generates a feature vector having increased contextual content for inferencing about parse tree 110 by machine learning (ML) model 150 such as for anomaly detection. Computer 100 may be one or more of a rack server such as a blade, a personal computer, a mainframe, a virtual computer, or other computing device.

1.1 Parse Tree

Parse tree 110 is a hierarchical data structure. Structured content such as text are represented by parse tree 110 that may be a parse tree or an abstract syntax tree (AST). In an embodiment, parse tree 110 represents a logic statement such as a database query such as structured query language (SQL) or a statement in a programing language such as a code source language such as a scripting language. In an embodiment, parse tree 110 instead represents a hierarchical document such as a document object model (DOM) for extensible markup language (XML) or JavaScript object notation (JSON).

Parse tree 110 consists of hierarchically connected nodes such as nodes 121-126. Trees, subtrees, and tree nodes are data structures stored in memory. A parent node may be connected to a child node by a referential link, such as a memory address pointer or array index, that may be stored in the parent node and/or child node and refers to the other node. Tree traversal may entail dereferencing such links between nodes. Tree traversal may occur in an enumeration ordering such as preorder, in order, or post order visitation of a parent node and child nodes. Regardless of ordering, tree traversal may be based on recursion, iteration, and/or queueing.

Tree nodes need not be contiguously stored in memory. Tree nodes may be dynamically allocated in memory. Subtrees are composable. For example, adding a subtree to a tree may entail linking the root node of the subtree, as a child node, to a parent node already in the tree. A tree node may contain or otherwise be associated with data fields that, by inspection, may facilitate comparison of tree nodes or tree paths such as discussed later herein.

1.2 Production Rule

In any case, parsing text such as a statement or document may entail mapping a formal grammar to portions of the text. The formal grammar may consist of reusable production rules such that a production rule may match a portion of text or may match a sequence of already matched production rules. A terminal symbol occurs whenever a production rule matches a portion of text, and a leaf node such as 123-124 is added to parse tree 110.

A nonterminal symbol occurs whenever a production rule matches a sequence of terminal and/or nonterminal symbols that already occurred, and a non-leaf node such as 121-122 and 125-126 is added to parse tree 110. Computer 100 records which production rule was matched to respectively create which node of parse tree 110. For example, production rule C matched a portion of text to create leaf node 123.

In some cases, a text portion must precisely match to use a production rule. For example, a production rule that matches a keyword of a language, such as SELECT in SQL, only matches exactly SELECT. In other cases, a same reusable production rule may match multiple portions of the same text, and the matching portions may be identical or different. Techniques using productions, production rules, and terminal and nonterminal symbols for generating tree nodes of a parse tree or an abstract syntax tree that conforms to a context free grammar are presented in related non-patent literature "Semantics of context-free languages" by Donald Knuth in *Mathematical systems theory* 2, no. 2 (1968): 127-145, which is incorporated herein by reference in its entirety.

Content of a leaf node may be circumstantial. For example, database queries may be automatically generated, based on textual templates or prepared statements, with some variables or placeholders for primary and foreign keys or for filtration constants such as literals. In other words, a client application may generate many queries that are structurally identical such that only the leaves of their parse trees differ, which is neither suspicious nor anomalous.

A SQL IN( ) clause may take a list of literal arguments. Even though literals in that list may differ, those multiple literals may each individually match a same reusable production rule to create multiple respective tree nodes. For example, although same production rule C was applied twice to separately create respective leaf nodes 123-124, those two matchings may have involved identical or different literals in different text portions.

In an embodiment, parse tree 110 conforms to a formal grammar that is a context free grammar (CFG). Analysis of a CFG parse tree is challenging because patterns of tree composition such as nesting of subtrees and nesting of similar tree nodes at different levels in parse tree 110 may obscure the structure of parse tree 110 such that a pattern in parse tree 110 may go undetected. Techniques for generating and analyzing parse tree 110 that conforms to a CFG are presented in related non-patent literature "Semantics of context-free languages".

In one anomaly detection scenario, an untrusted parse tree is structurally compared to a trusted parse tree. A technical problem with comparing two CFG parse trees is that the two trees may have substantially overlapping (i.e. similar) content that is differently located within both trees such that a linear enumeration of each tree's nodes, such as a preorder traversal, cannot be directly matched. For example if a small tree is a copy of a subtree of a big tree, then the small tree and the big tree have substantial similarity that may be computationally expensive to find because the big tree should be linearly scanned to find the location of the subtree, and then the subtree should be compared to the little tree.

1.3 Tree Path

For those reasons, tree analytics such as finding a pattern in parse tree 110 or comparing parse tree 110 to another tree may be computationally expensive and may not scale well according to how many nodes are in parse tree 110. For example, tree nodes 125-126 are not leaf nodes, which means that tree nodes 125-126 have child nodes. Thus, the vertical ellipses shown beneath tree nodes 125-126 represent various possible subtrees that may contain tens or hundreds of tree nodes, in which case parse tree 110 is immense. Thus, optimizations and heuristics may be essential for feasibility of tree analytics.

As discussed above, a parent node and a child node are linked. Intermediate nodes such as 122 and 125-126 operate both as parent nodes and as child nodes. For example, tree node 122 is a child of root node 121, and same node 122 also is a parent of leaf nodes 123-124.

Links between parent nodes and child nodes are traversable. A tree path containing multiple tree nodes may be monotonically traversed in a direction heading away from root node 121 and toward any leaf node. Parse tree 110 contains multiple tree paths of various lengths. Parse tree 110 contains multiple paths that begin at a same respective tree node and end at different respective tree nodes.

For example, one tree path may traverse from root node 121 to intermediate node 125, and another tree path may instead traverse from same root node 121 to leaf node 123. Likewise, parse tree 110 contains multiple paths that begin at different respective tree nodes and end at a same tree node. For example, one tree path may traverse from root node 121 to intermediate node 122, and another tree path may instead contain only intermediate node 122.

1.4 Bag of Rules

Machine learning (ML) model 150 may analyze parse tree 110 such as for anomaly detection. Example architectures, training techniques, and operating techniques for ML model 150 are presented later herein. In any case, using huge parse trees in their uncondensed form may be infeasible.

For example with directly analyzing a huge parse tree, training or inferencing latency of ML model 110 may be too long, inference accuracy of ML model 110 may be too low, and/or memory demand of ML model 110 may be too high. Thus, ML model 110 should analyze a summary of parse tree 110 such as bag of rules 141 or 142 in respective embodiments instead of directly analyzing parse tree 110 itself.

As discussed above, a same tree node may be contained in multiple overlapping tree paths of same or different lengths such as when one tree path completely or partially contains other tree path(s). In other words, parse tree 110 may contain many more tree paths than tree nodes. For example when only four tree nodes 121-124 are considered, there may be nine tree paths R-Z as shown in bag of rules 141. Thus, exhaustively extracting all tree paths from parse tree 110 and recording all of those paths in bag of rules 141 would not provide a simplifying summary of parse tree 110 for ML model 150 to analyze.

Bag of rules 141 is presented in one embodiment to demonstrate semantics. As discussed later herein, bag of rules 142 is presented in another embodiment to instead demonstrate encoding such as into a feature vector that ML model 150 accepts as input. Bags of rules 141-142 summarize the structure of parse tree 110 in an adjustable way as follows.

Columns in bags of rules 141-142 that are actually stored are shown bold. Columns in bags of rules 141-142 that are demonstrative, implied, and not stored are shown not bold. For example in bag of rules 141, various demonstrative columns indicate that path R starts at root node 121, ends at leaf node 123, and contains three tree nodes.

Bag of rules 140 summarizes both of tree structure and grammar parsing such that ML model 110 may recognize syntactic patterns within parse tree 110 without directly analyzing parse tree 110 by instead analyzing bag of rules 140. Bag of rules 140 is populated and analyzed as follows.

As discussed earlier herein, a same tree node may be contained in multiple overlapping tree paths of same or different lengths. In other words, parse tree 110 may contain many more tree paths than tree nodes. Thus, exhaustively extracting all tree paths from parse tree 110 and recording all of those paths in bag of rules 140 would not provide a simplifying summary of parse tree 110 for ML model 150 to analyze.

However, the following techniques and heuristics may limit the proliferation of tree paths such that bag of rules 140 is a compact and meaningful structural summary of parse tree 110 as follows. Many or all tree nodes are in some ways distinct such as residing at respective unique memory addresses and being created from respective text portions at respective unique positions within the whole text. Those distinctions are not included in bag of rules 140, which limits the scope of details in bag of rules 140 to decrease memory demand and complexity of bag of rules 140.

Such limiting of detail scope entails storing, into bag of rules 140, references to respective production rules that created tree nodes in tree paths instead of storing references to tree nodes themselves. For example, paths Y-Z in bag of rules 140 refer to production rule C instead of referring to leaf nodes 123-124. Thus, paths Y-Z are duplicates, even though they represent different actual tree paths in parse tree 110.

In an embodiment, duplicate paths are encoded in bag of rules 140 as a single path and a duplication count. In an embodiment, bag of rules 140 stores the single path and a Boolean that indicates duplication but does not store the duplication count. In an embodiment, bag of rules 140 stores the single path and no indication nor count of duplication.

1.5 Path Length

Some tree paths are too short to reveal any significant structure of parse tree 110. Some paths may be too long for various reasons. For example, a long path is unlikely to match any predefined pattern nor match part of another parse tree. Likewise, a long path may need extra storage space and/or processing time.

Thus, tree paths that are too short or too long should be excluded from bag of rules 140. In an embodiment, bag of rules 140 has a minimum path length and/or a maximum path length. In an embodiment, bag of rules 140 only stores paths having particular preselected lengths.

For example, bag of rules 140 may store only paths of lengths two and four. In that case, paths of lengths one and three would not be stored such as paths R-S and W-Z. Thus, bag of rules 140 may contain fewer or more paths than shown. For example although not shown, tree nodes 125-126 may contain many subtrees that contain many paths of lengths two and four.

In that way, the breadth of bag of rules 140 is adjustable according to predefined path lengths that may be experimentally tuned to improve various performance characteristics of ML model 150 discussed earlier herein. For example, the set of predefined path lengths may be a hyperparameter of ML model 150 that is automatically optimized by repeatedly reconfiguring and retraining ML model 150 such as randomly, sampling hyperparameters at intervals, and/or greedily according to gradient descent. For example, different training corpuses may have different respective sets of optimal path lengths for a same ML model. Likewise, different ML models may have different respective sets of optimal path lengths for a same training corpus.

1.6 Feature Vector

Both bags of rules 141-142 summarize the structure of same parse tree 110 based on paths that occur in parse tree 110. As follows, bag of rules 142 is configured and populated for inclusion in a feature vector that ML model 150 accepts as input. In this example, bag of rules 142 summarizes only paths of predefined lengths one and three.

Configuration of bag of rules 142 before populating bag of rules 142 may be based on experimentation and/or optimization such as in a laboratory as follows. As explained above, hyperparameter optimization based on repeated, with a same training corpus (not shown) of many parse trees, reconfiguration and/or retraining of ML model 150 and/or bag of rules 142 may detect that bag of rules 142 is optimally based only on paths of lengths one and three.

In an embodiment, configuration of bag of rules 142 is further based on optimized selection of features that detects which sequences of production rules are important to inferencing by ML model 150. For example, the training corpus may contain tree paths of lengths one and three that are based on distinct sequences of production rules that variously consist of some of production rules A-D. Optimized feature selection may indicate that paths of length one that are based only on production rule A, such as tree path W, are unimportant to inferencing. Thus, bag of rules 142 is configured to exclude path W, which is why W is not shown in the paths column of bag of rules 142.

As shown, bag of rules 142 is optimally configured to contain five rows of distinct production rule sequences (i.e. ABC, ABD, B, C, D), no matter which parse tree is summarized by bag of rules 142 and no matter which of those paths actually occur in the parse tree. The count column tallies how many times does each included production rule sequence occur in parse tree 110. For example, production rule sequence ABC occurs twice in parse tree 110 as tree paths R-S, which is why the top row of bag of rules 142 shows R-S and two.

Some production rule sequences are absent in parse tree 110 even though optimized feature selection detected that those production rule sequences are important for inferencing. For example, the bottom row of bag of rules 142 has empty paths and a count of zero.

As explained earlier herein, only the count column of bag of rules 142 is shown bold to indicate that only the count column is stored. Thus, bag of rules 142 is encoded as only five unsigned integers (e.g. five respective bytes) in a feature vector (not shown), no matter how many tree nodes are contained in parse tree 110 and no matter how many tree paths of all possible lengths are contained in parse tree 110. In other words, bag of rules 142 is highly scalable such that increasing scale of parse tree 110 causes arithmetically increased tallies in the count column without needing a larger bag of rules 142.

Thus, a fixed size bag of rules 142 can summarize any parse tree in the training corpus. A larger bag of rules 142 might possibly be needed to accommodate a more complicated formal grammar such as consisting of many more distinct production rules than only A-D. Because a grammar tends to be more compact than the training corpus containing many parse trees, and because the grammar is fixed even though the training corpus may grow, bag of rules 142 likely has a moderate fixed size, even though the training corpus may be immense.

Thus, the architecture of bag of rules 142 is optimized for practical and scalable machine learning. That is within the memory of computer 100, bag of rules 142 and the feature vector that contains bag of rules 142 are themselves improved data structures that improve the performance of ML model 150 as discussed earlier herein.

2.0 Example Inferencing Process

Figure 2:
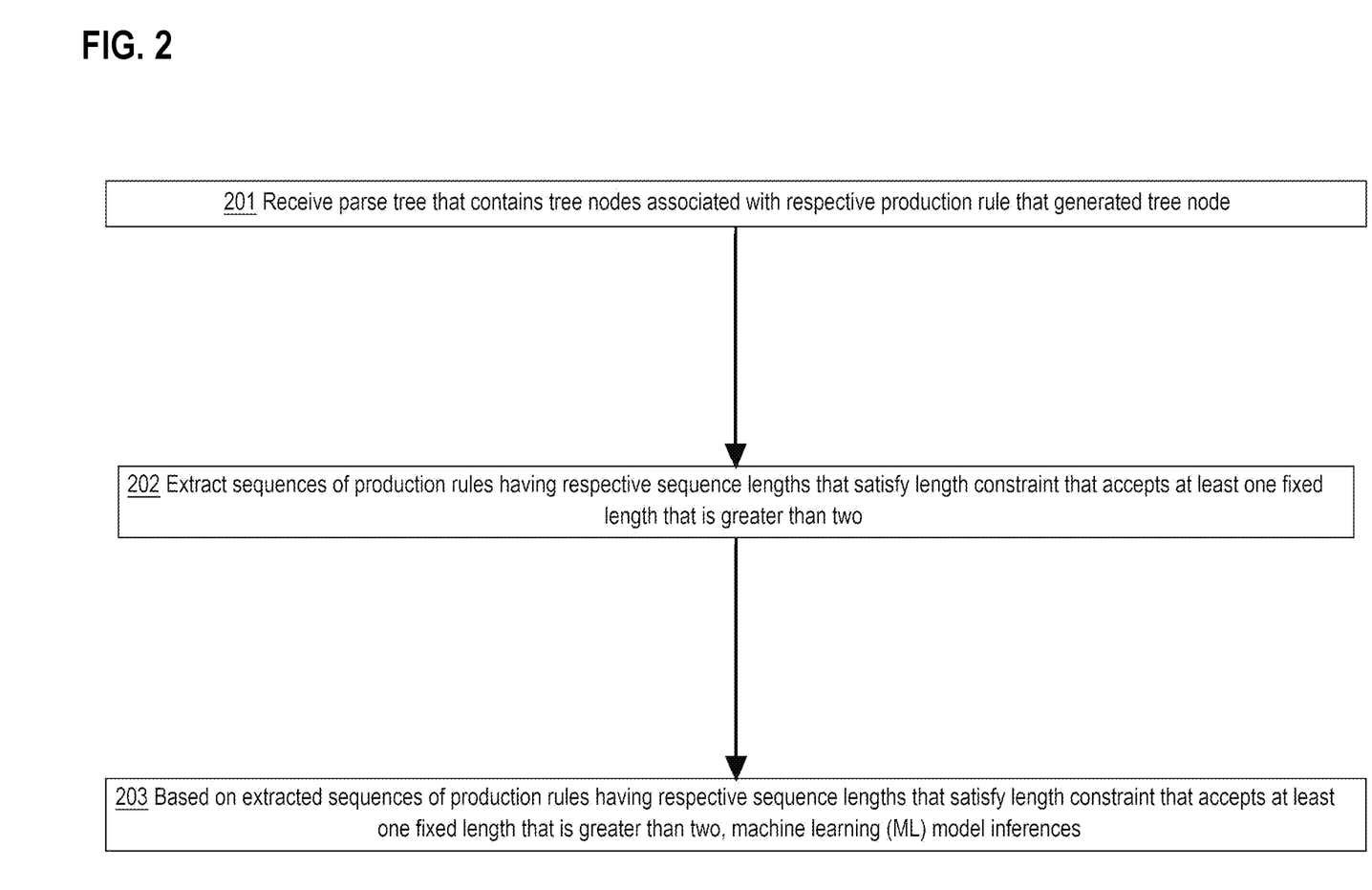
FIG. 2 is a flow diagram that depicts an example computer process that, according to tree paths in a parse tree, extracts sequences of production rules to populate a bag of rules for inferencing by an ML model.

FIG. 2 is a flow diagram that depicts an example process that computer 100 performs, according to tree paths in parse tree 110, to extract sequences of production rules to populate bag of rules 140 for inferencing by machine learning (ML) model 150. FIG. 2 is discussed with reference to FIG. 1.

Step 201 receives parse tree 110 that contains tree nodes 121-126 that are associated with a respective production rule that generated each tree node. For example, parsing a text such as natural language or a semi-structured document, logic statement, or script that contains logic statements may cause reusable production rules A-D to repeatedly match portions of the text or match sequences of already matched other production rules. For example, production rule C matches respective portions of text to cause creation of leaf nodes 123-124. Likewise, production rule B matches a sequence containing already matched production rule C twice to create tree node 122.

Each tree node is associated with the production rule used to create the tree node. In an embodiment, a tree node contains a reference such as a memory address pointer or an array offset that identifies which production rule was used to create the tree node. In an embodiment, a production rule contains multiple references to respective tree nodes whose creation is based on the production rule. In an embodiment, a map such as a lookup table indicates which production rule was used to create which tree node.

Step 202 extracts sequences of production rules having respective sequence lengths that satisfy a predefined length constraint that accepts at least one fixed length that is greater than two. In one example, the constraint accepts only paths having a length of three. In another example, the constraint accepts only paths having a length of one or five. Thus in various examples, various respective amounts of different lengths are acceptable. In any case as discussed earlier herein, step 202 may populate bag of rules 142 based on tallies of those extracted production rule sequences and encode bag of rules 142 into a feature vector.

Production rules that cause creation of leaf nodes are known herein as terminal production rules. In an embodiment, sequences of length one that contain only a terminal production rule are excluded from bag of rules 142 even if bag of rules 142 contains other sequences of length one. In an embodiment, all sequences that contain (i.e. end with) a terminal production rule are excluded from bag of rules 142 even if bag of rules 142 contains other sequences of similar lengths.

Based on extracted sequences of production rules having respective sequence lengths that satisfy the length constraint that accepts at least one fixed length that is greater than two, ML model 150 inferences in step 203. For example, ML model 150 may be applied to the feature vector to detect that parse tree 110: a) is similar to anomalous or non-anomalous parse trees in a training corpus, or b) is dissimilar to the parse trees in the training corpus. For example, ML model 150 may infer an anomaly score such as a probability that parse tree 110 is anomalous.

Parse tree 110 may be classified as anomalous or non-anomalous based on whether or not the anomaly score exceeds a predefined threshold. If parse tree 110 is anomalous, it may be specially handled such as rejected, diverted for further manual or automatic inspection, logged, and/or added to the training corpus.

3.0 Example Feature Vector Usage

Figure 3:
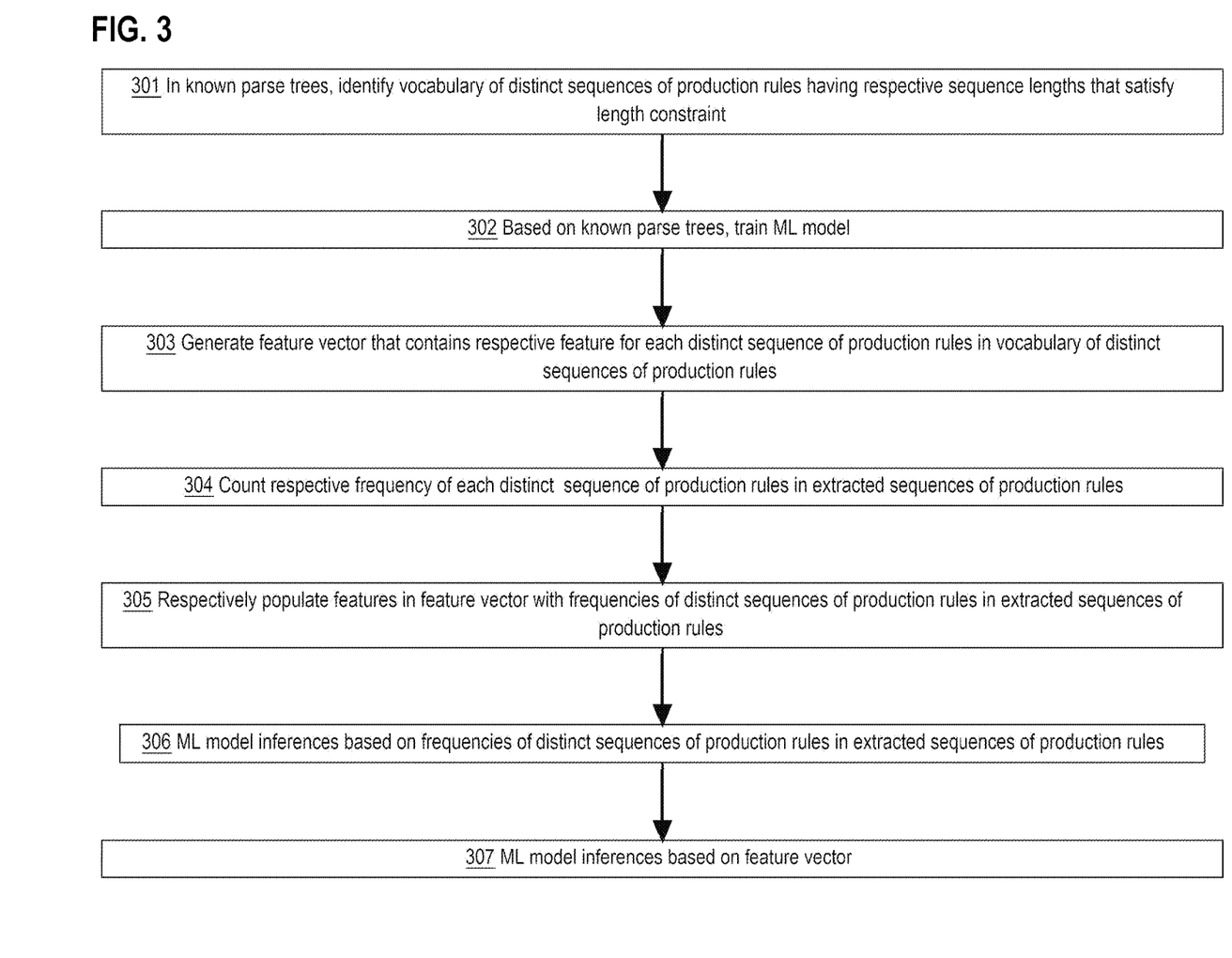
FIG. 3 is a flow diagram that depicts an example computer process to configure, populate, and use a feature vector such as for a training phase for an ML model and/or an inferencing phase by the ML model.

FIG. 3 is a flow diagram that depicts an example process that computer 100 performs to configure, populate, and use a feature vector such as for a training phase for ML model 150 and/or an inferencing phase by ML model 150. Either phase may involve parse tree 110 and/or bag of rules 142. FIG. 3 is discussed with reference to FIG. 1.

Steps 301-302 occur during the training phase. Because training may implicitly entail inferencing in some embodiments, inferencing steps 303-307 may be repeated during the training phase and the inferencing phase in those embodiments. In known parse trees, step 301 identifies a vocabulary of distinct sequences of production rules having respective sequence lengths that satisfy a predefined length constraint that only accepts sequences of particular length(s).

For example as discussed earlier herein, a training corpus may contain known parse trees. As explained earlier herein, step 301 may perform configuration tuning such as hyperparameter optimization and optimized feature selection such that the predefined length constraint and the vocabulary of distinct production rule sequences are optimal for applying ML model 150 to the training corpus. For example as shown in bag of words 142, the vocabulary of distinct sequences may optimally consist of ABC, ABD, B, C, and D.

Based on the known parse trees, step 302 supervised or unsupervised trains ML model 150. For example if the training corpus is labeled such that the known parse trees are respectively labeled as anomalous or non-anomalous, then ML model 150 may have any architecture and training may or may not be supervised. If the training corpus is unlabeled, then training is unsupervised such as when ML model 150 is an autoencoder as discussed later herein.

The training corpus may directly consist of parse trees, or may instead consist of whole texts that can be parsed into parse trees on demand. In any case, training and production deployment of ML model 150 may occur on same or separate computers. Training and production use may separately repeat steps 303-307 as follows.

Step 303 configures/generates a feature vector that contains a respective feature for each distinct sequence of production rules in the vocabulary that step 301 established. For example as shown, bag of rules 142 is configured with five rows because the vocabulary consists of five production rule sequences that are ABC, ABD, B, C, and D. Because only the count column is stored, bag of rules 142 is stored in the feature vector as five unsigned integers as discussed earlier herein.

Many occurrences of only those five production rule sequences may be extracted, isolated, identified, or otherwise selected in parse tree 110. By tallying as described earlier herein, step 304 counts a respective frequency of those five distinct vocabulary sequences of production rules in the many extracted sequences that may include duplicates.

Step 305 populates those five features in the feature vector with the frequencies of distinct sequences of production rules as counted in step 304. In an embodiment, each of those five features is an unsigned integer that is stored in the feature vector as a respective byte.

Together, repeatable steps 306-307 are inferencing activities that generate a single inference from a single input feature vector for a single parse tree. Thus, various embodiments may have step 306 or 307 or both combined into a same step. In step 306, ML model 150 inferences based on the frequencies of distinct sequences of production rules as counted in step 304.

In step 307, ML model 150 inferences based on the feature vector, which may contain other features in addition to the vocabulary frequency features. For example, the feature vector may contain additional features such as a count of nodes in parse tree 110, a width (i.e. count of leaf nodes) of parse tree 110, a height (i.e. length of longest path) of parse tree 110, a count of tree nodes and/or tree paths that are excluded from bag of rules 142, and/or a count of distinct production rules in parse tree 110 such as: including only production rules in the vocabulary, including all production rules, and/or excluding production rules in the vocabulary. For example as shown, bag of rules 142 contains only three distinct production rules A-C that are used in the vocabulary.

6.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

6.1 Metadata Definitions

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces.

A tablespace is a set of one or more files that are used to store the data for various types of database objects, such as a table. If data for a database object is stored in a tablespace, a database dictionary maps a database object to one or more tablespaces that hold the data for the database object. A database dictionary is referred to by a DBMS to determine how to execute database commands submitted to a DBMS. Database commands can access the database objects that are defined by the database dictionary.

6.2 Database Operation

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

6.3 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
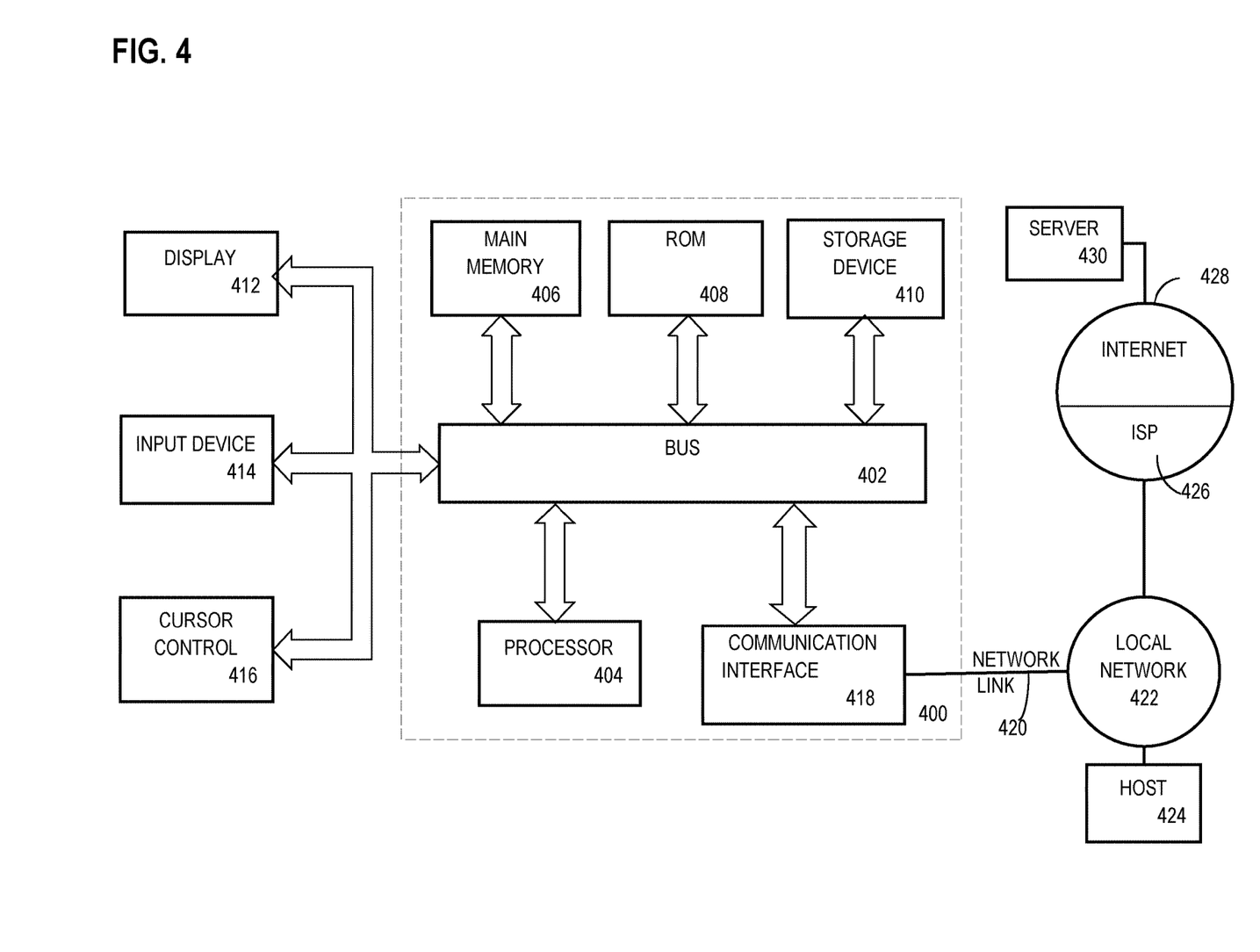
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory computer-readable media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
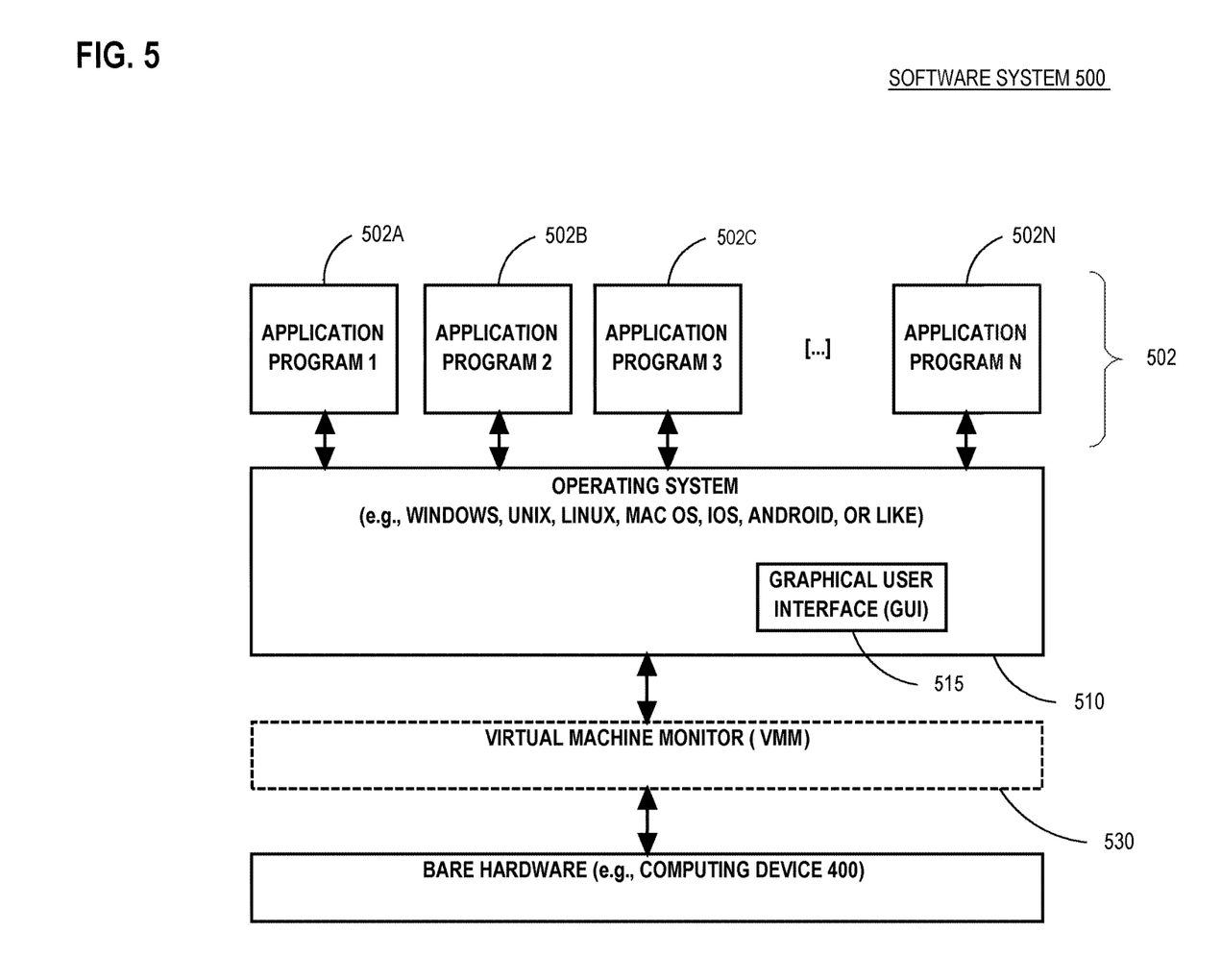
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neutral Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons.

A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the dataset, such as with feature bootstrap aggregating (bagging). Therefore, the decision trees gain accuracy as the decision trees grow without being forced to over fit training data as would happen if the decision trees were forced to learn all feature dimensions of the dataset. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a parse tree that contains a plurality of tree nodes, wherein each tree node of the plurality of tree nodes is associated with a respective production rule that generated the tree node;
   extracting an extracted plurality of sequences of production rules having respective sequence lengths that satisfy a predefined length constraint that only accepts at least one fixed length that is greater than two, wherein each sequence of production rules of the extracted plurality of sequences of production rules consists of respective production rules of a sequence of tree nodes in a respective directed tree path of the parse tree having a path length that satisfies same said predefined length constraint that only accepts said at least one fixed length that is greater than two; and
   inferencing from the parse tree, by a machine learning (ML) model, based on the extracted plurality of sequences of production rules having respective sequence lengths that satisfy said predefined length constraint that only accepts said at least one fixed length that is greater than two.

2. The method of claim 1 wherein said extracting said extracted plurality of sequences of production rules comprises extracting said extracted plurality of sequences of production rules having respective sequence lengths that satisfy said predefined length constraint that only accepts said at least one fixed length.

3. The method of claim 1 wherein:
   the method further comprises counting a respective frequency of each distinct sequence of production rules in said extracted plurality of sequences of production rules;
   said ML model inferencing is further based on said frequencies of said distinct sequences of production rules in said extracted plurality of sequences of production rules.

4. The method of claim 3 wherein:
   the method further comprises:
      identifying a vocabulary plurality of distinct sequences of production rules having respective sequence lengths that satisfy said predefined length constraint in a plurality of known parse trees,
      generating a feature vector that contains a respective feature for each distinct sequence of production rules in said vocabulary plurality of distinct sequences of production rules, and
      respectively populating said features in said feature vector with said frequencies of said distinct sequences of production rules in said extracted plurality of sequences of production rules;
   said ML model inferencing is further based on said feature vector that contains said frequencies of said distinct sequences of production rules in said extracted plurality of sequences of production rules.

5. The method of claim 4 further comprising, based on said plurality of known parse trees, performing one selected from a group consisting of: supervised training the ML model and unsupervised training the ML model.

6. The method of claim 1 wherein said ML model inferencing based on the extracted plurality of sequences of production rules comprises inferencing based on the plurality of sequences, having said sequence lengths that satisfy said predefined length constraint that only accepts said at least one fixed length that is greater than two, of production rules of said parse tree of one selected from a group consisting of: a logic statement, a document object model (DOM), a scripting language script, and natural language.

7. The method of claim 6 wherein said ML model inferencing based on the extracted plurality of sequences of production rules comprises inferencing based on the plurality of sequences, having said sequence lengths that satisfy said predefined length constraint that only accepts said at least one fixed length that is greater than two, of production rules of said parse tree of said logic statement selected from a group consisting of: a database query, a structured query language (SQL) statement, a scripting language statement, and a statement of a general-purpose programing language.

8. The method of claim 1 wherein said extracting said extracted plurality of sequences of production rules of sequences of tree nodes in directed tree paths excludes tree paths that contain tree leaves.

9. The method of claim 1 wherein:
   said extracted plurality of sequences of production rules of sequences of tree nodes in directed tree paths contains a first sequence of production rules of a first sequence of tree nodes and a second sequence of production rules of a second sequence of tree nodes;
said first sequence of tree nodes contains said second sequence of tree nodes.

10. The method of claim 1 wherein said ML model inferencing based on the extracted plurality of sequences of production rules comprises said ML model detecting that said parse tree is anomalous.

11. One or more non-transitory computer-readable media storing instructions that, when executed by one or more processors, cause:
receiving a parse tree that contains a plurality of tree nodes, wherein each tree node of the plurality of tree nodes is associated with a respective production rule that generated the tree node;
extracting an extracted plurality of sequences of production rules having respective sequence lengths that satisfy a predefined length constraint that only accepts at least one fixed length that is greater than two, wherein each sequence of production rules of the extracted plurality of sequences of production rules consists of respective production rules of a sequence of tree nodes in a respective directed tree path of the parse tree having a path length that satisfies same said predefined length constraint that only accepts said at least one fixed length that is greater than two; and
inferencing from the parse tree, by a machine learning (ML) model, based on the extracted plurality of sequences of production rules having respective sequence lengths that satisfy said predefined length constraint that only accepts said at least one fixed length that is greater than two.

12. The one or more non-transitory computer-readable media of claim 11 wherein said extracting said extracted plurality of sequences of production rules comprises extracting said extracted plurality of sequences of production rules having respective sequence lengths that satisfy said predefined length constraint that only accepts said at least one fixed length.

13. The one or more non-transitory computer-readable media of claim 11 wherein:
the instructions further cause counting a respective frequency of each distinct sequence of production rules in said extracted plurality of sequences of production rules;
said ML model inferencing is further based on said frequencies of said distinct sequences of production rules in said extracted plurality of sequences of production rules.

14. The one or more non-transitory computer-readable media of claim 13 wherein:
the instructions further cause:
identifying a vocabulary plurality of distinct sequences of production rules having respective sequence lengths that satisfy said predefined length constraint in a plurality of known parse trees,
generating a feature vector that contains a respective feature for each distinct sequence of production rules in said vocabulary plurality of distinct sequences of production rules, and
respectively populating said features in said feature vector with said frequencies of said distinct sequences of production rules in said extracted plurality of sequences of production rules;
said ML model inferencing is further based on said feature vector that contains said frequencies of said distinct sequences of production rules in said extracted plurality of sequences of production rules.

15. The one or more non-transitory computer-readable media of claim 14 wherein the instructions further cause based on said plurality of known parse trees, performing one selected from a group consisting of: supervised training the ML model and unsupervised training the ML model.

16. The one or more non-transitory computer-readable media of claim 11 wherein said ML model inferencing based on the extracted plurality of sequences of production rules comprises inferencing based on the plurality of sequences, having said sequence lengths that satisfy said predefined length constraint that only accepts said at least one fixed length that is greater than two, of production rules of said parse tree of one selected from a group consisting of: a logic statement, a document object model (DOM), a scripting language script, and natural language.

17. The one or more non-transitory computer-readable media of claim 16 wherein said ML model inferencing based on the extracted plurality of sequences of production rules comprises inferencing based on the plurality of sequences, having said sequence lengths that satisfy said predefined length constraint that only accepts said at least one fixed length that is greater than two, of production rules of said parse tree of said logic statement selected from a group consisting of: a database query, a structured query language (SQL) statement, a scripting language statement, and a statement of a general-purpose programing language.

18. The one or more non-transitory computer-readable media of claim 11 wherein said extracting said extracted plurality of sequences of production rules of sequences of tree nodes in directed tree paths excludes tree paths that contain tree leaves.

19. The one or more non-transitory computer-readable media of claim 11 wherein:
said extracted plurality of sequences of production rules of sequences of tree nodes in directed tree paths contains a first sequence of production rules of a first sequence of tree nodes and a second sequence of production rules of a second sequence of tree nodes;
said first sequence of tree nodes contains said second sequence of tree nodes.

20. The one or more non-transitory computer-readable media of claim 11 wherein said ML model inferencing based on the extracted plurality of sequences of production rules comprises said ML model detecting that said parse tree is anomalous.

* * * * *